Patented May 25, 1937

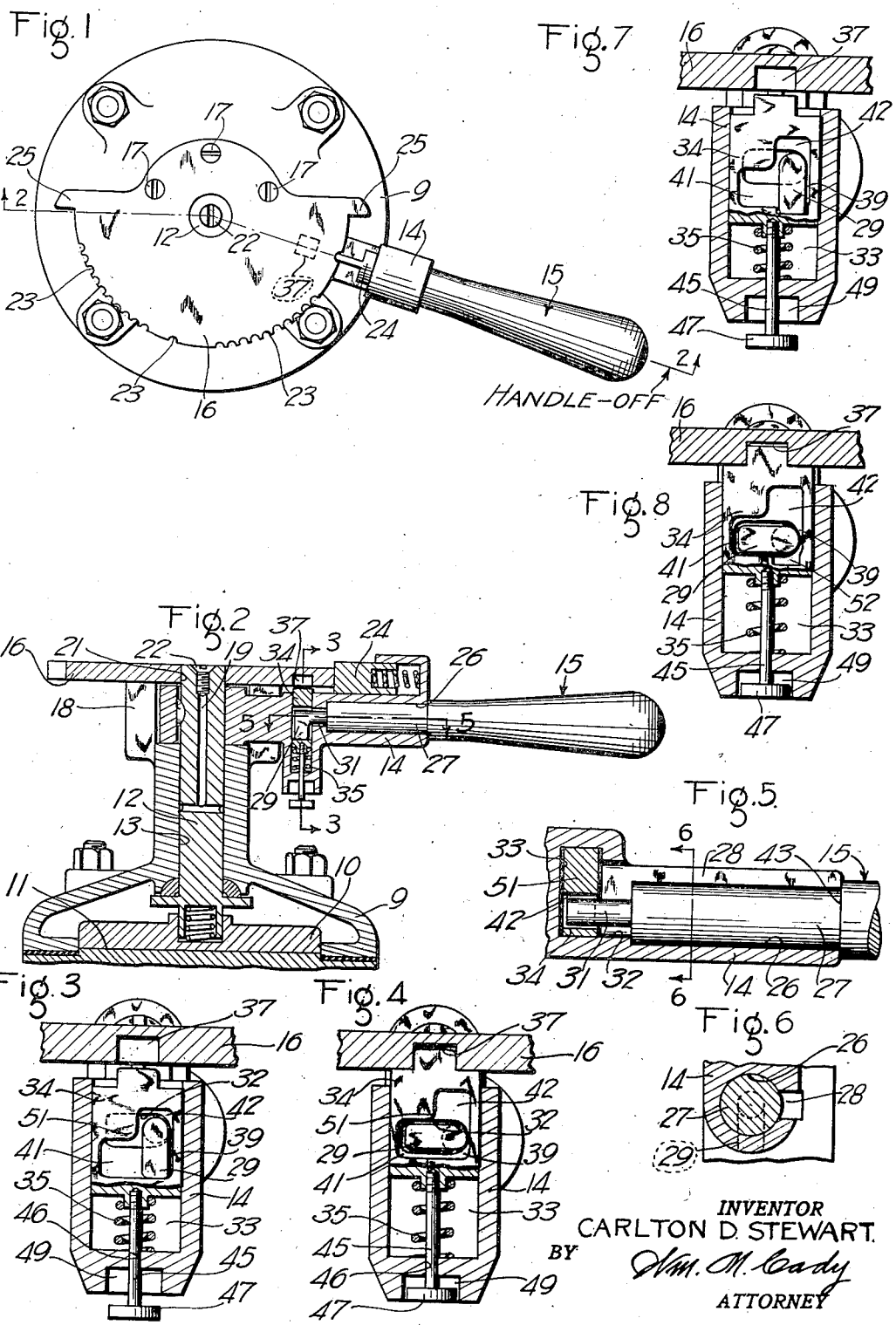

2,081,464

UNITED STATES PATENT OFFICE 2,081,464

BRAKE VALVE DEVICE

Carlton D. Stewart, Swissvale, Pa., assignor to The Westinghouse Air Brake Company, Wilmerding, Pa., a corporation of Pennsylvania Application June 12, 1935, Serial No. 26,133

20 Claims. (Cl. 303—56)

This invention relates to fluid pressure brakes and particularly to a brake valve device for use with a fluid pressure brake system in which the operating handle is removable only in one position thereof.

It is an object of my invention to provide a novel construction in a brake valve device whereby the exact operating position of the operating handle is at all times clearly visible and in which the operating handle may be removed only in one position thereof, the brake valve device being locked against unauthorized operation when the handle is removed.

Other objects and advantages will be apparent in the following description of my invention, which is illustratively shown in the accompanying drawing, wherein Figure 1 is a plan view of a brake valve device embodying my invention, Figure 2 is a fragmentary sectional elevational view, taken on line 2—2 of Figure 1, showing details of my invention, Figure 3 is an enlarged sectional view, taken on line 3—3 of Figure 2, Figure 4 is a view, showing the parts of Figure 3 in another position, Figure 5 is an enlarged sectional view, taken on line 5—5 of Figure 2, Figure 6 is a sectional view, taken on line 6—6 of Figure 5, Figure 7 is a sectional view, corresponding to Figure 3, showing a modified structure, and Figure 8 is a view, showing the parts of Figure 7 in another position.

Referring to the drawing, my invention is illustratively shown in connection with a brake valve device having a casing 9 in which is a rotary valve 10 movable on a valve seat 11, the cooperating ports and passages in the valve 10 and valve seat 11 being omitted for the sake of simplicity.

A rotary stem 12, by means of which the valve 10 is rotarily moved, fits closely in a bore 13 in the upper sleeve-like portion of the casing, and is suitably interlocked at the inner end thereof with the valve 10, the outer end of the stem projecting exteriorly of the casing.

A socket member 14 is keyed or otherwise suitably secured in perpendicular relation to the outer end of the stem 12 and is adapted, as described hereinafter, to receive a removable handle 15.

A quadrant or sector plate 16 is secured, as by screws 17, to an arcuate bracket 18 formed on or secured at one side of the sleeve-like portion of the casing in a manner not interfering with free operating movement of the handle 15. The bracket 18, in effect, constitutes an extension of the sleeve-like portion of the casing, and thus the sector plate 16 is positioned over and covers the socket member 14. In order to provide access to the lubricating bore 19 which opens at the outer end of stem 12, the sector plate has an opening 21 therein, through which the outer end of the stem is exposed, the end of the stem 12 terminating, preferably, flush with the outer surface of the sector plate 16. Any suitable means, such as the flat head screw 22, may be provided for closing the end of the bore 19.

The sector plate 16 is provided with suitable notches 23 on the periphery thereof, with which a spring biased latch 24 on the outer end of the socket member 14 cooperates to yieldingly and firmly hold the socket member and handle 15 in the various operating positions thereof. Suitable lugs 25 are formed at the opposite ends of the sector plate and are adapted to be engaged by the latch 25, for limiting the rotary operating movement of handle 15 in opposite directions.

It will be seen that the sector plate is mounted so as to enable the operator to have, at all times, a clear and unobstructed view of the notches thereon, in order that he may be accurately apprised of the exact position of the handle 15. This is a desirable feature of my invention which is especially advantageous in cases where the number of the notches on the sector plate is large and their spacing relatively close, as shown, because in such cases operating skill and sense of touch are insufficient to accurately apprise the operator of the exact position of the handle.

A fluid pressure brake system having a brake valve device, the sector plate of which requires a large number of closely spaced notches is disclosed in the co-pending application, of which Clyde C. Farmer and I are joint applicants, Serial No. 757,138, filed December 12, 1934, and assigned to the assignee of this application. In this system, changes in brake cylinder pressure may be effected in definite small increments, such as two pounds, by means of the brake valve device and associated apparatus disclosed, and each successive increment is represented by a corresponding notch on the sector plate of the brake valve device. It is thus essential that the operator have a clear and unobstructed view of the brake valve device sector plate and notches thereon, in order that he may accurately position the handle of the brake valve device to secure the desired brake cylinder pressure or change in brake cylinder pressure, without having to rely on acquired skill and sense of touch.

According to my invention, the socket member 14 is provided, as shown in Figures 2, 5 and 6 with a longitudinal bore 26, open at the outer end of the socket member, for receiving the cylindrical shank 27 of the handle 15 in close fitting relation, the bore 26 being open at one side through a transverse slot 28 in the wall of the socket member, through which an eccentric cam or lug 29, on the reduced end portion 31 of the shank 27, slides upon entry or removal of the handle from the socket member. The handle 15 is thus oriented rotarily on its own axis in a predetermined position as it enters or is removed from the socket member for a purpose which will be made apparent hereinafter.

The bore 26 and slot 28 in the socket member open at the inner end thereof into a polygonal bore or recess 33 in the socket member 14, through a rectangular opening 32 conforming to the contour of lug 29. The bore 33 is perpendicular to the bore 26 and opens at the upper surface of the socket member adjacent to the lower face of the sector plate 16. Conforming to the cross section of the bore 33 and slidable therein is a locking bolt 34 which is urged outwardly by a spring 35 interposed in the bore 33 between the inner end of the bolt 34 and the bottom of the bore 33. The bore 33 and bolt 34 are illustrated as polygonal in form in order to prevent rotation of the bolt in the bore, but may be cylindrical in form if the bolt is locked against rotation in the bore, as by cooperation of a pin and slot thereon, respectively.

The lower face of sector plate 16 is so closely adjacent to the upper side of the socket member 14 that the bolt cannot be moved outwardly of the bore 33 unless the socket member is positioned in a certain desired position, designated as "handle-off" position, as shown in Figure 1, a recess 37 opening at the lower face of the sector plate 16, permitting outward movement of the bolt 34 in the bore 33 in the "handle-off" position of the handle. With the outer end of bolt 34 engaged in the recess 37 of the sector plate, the socket member 14 and therefore the rotary valve 10, are locked against operative movement relative to the casing.

According to my invention, shifting of the bolt 34 inwardly and outwardly of the bore 33 is effected by manual rotary movement of handle 15 on its own axis. To accomplish this purpose, the bolt 34 is provided, as shown in Figures 3 and 4, with a transverse recess 39 of L shape, having one leg 41 perpendicular to, and the other leg 42 parallel to, the longitudinal axis of the bolt 34, the recess opening toward the inner end of bore 26 and slot 28.

With the socket member locked in "handle-off" position, the bolt 34 being in its outer position, the leg 41 of the recess 39 is in registry with the inner end of bore 26 and slot 28, and thus receives thereinto the reduced end of the shank 27 and the lug 29, when the handle is inserted into the socket member, inward movement of the handle being limited by engagement of an annular stop shoulder 43 at the outer end of the shank 27 on handle 15 with the outer end of the socket member 14.

Upon manual rotation of handle 15 on its own axis in a counter-clockwise direction, as viewed in, and from the position shown in, Figure 4, the lug 29 on the handle engages the bolt and moves it inwardly of the bore 33, against the opposing force of spring 35, and thereby causes the bolt 34 to leave the recess 37 of the sector plate and move out of interlocking engagement with the sector plate. The bolt 34 is held in its inner position without applying any manual force tending to rotate the handle on its own axis, by rotating the handle through ninety degrees from the position shown in Figure 4 to that shown in Figure 3, in which latter position the spring 35 can exert no reverse turning movement on the handle, because the force of the spring acts in the plane of the lug and through the longitudinal axis of the handle. Since the lug 29 has a flat end of appreciable width, it will be apparent, that a positive intentional force must be applied to rotate the handle 15 on its axis, out of the position shown in Figure 3, the spring 35 resiliently pressing the bolt 34 against the flat end of the lug and yieldingly holding the handle against undesired or unintentional rotation on its own axis. Thus, once the handle has been rotated on its own axis to the position for holding the bolt 34 in its inner or retracted position, the handle may be moved out of "handle-off" position and subsequently back and forth through "handle-off" position without the handle becoming unintentionally loosened in the socket member 14.

With the handle 15 in "handle-off" position, the handle may be removed from the socket member 14, by manually rotating the handle on its own axis from the position shown in Figure 3, in a clockwise direction. Upon rotation of the handle sufficiently to disengage the flat end of the lug 29 from the bolt 34, the spring 35 acts to snap the bolt 34 outwardly into engagement in the recess 37 of the sector plate and thus automatically turns the handle, through the lug 29, to the position shown in Figure 4, wherein the handle may be removed from the socket member 14 by pulling it outwardly of the bore 26 and slot 28.

In order to relieve the force of spring 35 on the end of lug 29, when the lug is positioned as shown in Figure 3, and thereby ease or reduce the manual force initially required to rotate the handle on its own axis, as just described, a stem 45 may be provided, which is screwed or otherwise secured at one end to the inner end of the locking bolt 34 and which extends externally of the socket member 14, through a suitable opening 46 at the bottom of the bore 33. A button 47 is provided on the outer end of the stem, for manually grasping the end of the stem. Upon pulling the stem 45 outwardly the bolt 34 moves inwardly of the bore 33 and compresses the spring 35, thereby relieving the lug of the force of the spring.

In order to render the button 47 on the stem 45 inaccessible, when the bolt 34 is in its outer or locking position, and thereby prevent unauthorized retraction of the bolt 34, by means of the stem 45, out of locking engagement with the sector plate 16 when the handle 15 is out of the socket member, the socket member 14 is provided with a recess 49 therein, which the button 47 enters with a close fit, in the outer or locking position of the bolt, as shown in Figure 4.

With the handle 15 in any position other than "handle-off" position, removal of the handle 15 from the socket member 14 is prevented. It will be understood from the foregoing description that in order for the handle 15 to be moved out of "handle-off" position, the handle must first be rotated on its own axis to retract the bolt 34. Thus, with the handle out of "handle-off" position, if reverse rotation of the handle on its own axis is attempted, the sector plate prevents movement of the bolt 34 from its retracted position to its outer position. The lug 29 on the handle thus engages the shoulder 51 between the legs 41 and 42 of the recess 39 in the bolt, and is stopped in that position, the leg 41 of the recess 39 being maintained out of registry with the inner end of the bore 26 and slot 28. Consequently, the lug 29 is locked in the bore 33 and the handle 15 cannot therefore be removed from the socket member.

A modified structure is shown in Figures 7 and 8, which differs from the first described embodiment in having a notch 52 in the lower edge of the leg 41 of recess 39 in the bolt 34, which notch receives thereinto the end of lug 29 on the handle 15, when the handle is turned to hold the bolt 34 in retracted position. The handle 15 is thus positively locked against reverse rotation on its own axis out of the position shown in Figure 7, until released by pulling the stem 45 outwardly to further retract the bolt 34 and thereby disengage the end of lug 29 from the notch 52.

It will thus be seen that I have provided a brake valve device in which the sector plate is so mounted as to render the exact position of the handle clearly visible to the operator at all times, whereby accurate control may be exercised independently of skill or sense of touch. It will also be seen that I have provided novel means for preventing removal of the handle of a control device, such as a brake valve device, unless the handle is oriented in a certain position, which means also functions to lock the control element or valve against movement upon removal of the handle from the device.

It will, furthermore, be seen that the structure I have devised enables the removable handle to be relatively light in weight and small in size, the usual heavy socket portion not being a part of the removable handle. In addition, the construction I have devised prevents the occurrence of any loose mechanical connection between the handle and the control element or valve, due to the fact that the handle receiving socket member is rigidly and permanently secured to the operating stem and is not removed therefrom except for replacement or repair purposes, and also because the handle is securely and rigidly held or locked in the socket member.

While I have disclosed only two embodiments of my invention, and these as applied to a brake valve device for a fluid pressure brake system, it should be understood that my invention is not limited to such devices but may be employed in connection with other types of control devices, such as for controlling electrical circuits. It should also be understood that various omissions, additions or changes may be made in the construction as described herein, without departing from the spirit of the invention. It is not my intention, therefore, to limit the scope of the invention except as necessitated by the prior art and as defined in the appended claims.

Having now described my invention, what I claim as new and desire to secure by Letters Patent, is:

1. A control device comprising a casing, control means, a member associated with the casing and movable relative thereto for operating said control means, an element carried by said member and operative to lock the said member against movement relative to the casing, and an axially rotatable handle carried by said member and adapted upon axial rotation to operate the said element to unlock said member for movement relative to the casing.

2. A control device comprising a casing, control means, a member associated with the casing and movable relative thereto for operating said control means, a handle removably carried by said member for moving said member, and locking means effective, except when the said member is in one position, to prevent removal of the handle from the said member, and effective to lock said member against movement relative to the casing upon removal of the handle from the said member.

3. A control device comprising a casing, control means, a member associated with the casing and movable relative thereto for operating said control means, an element operative to lock said member against movement relative to the casing, and an axially rotatable handle, carried by said member, adapted upon axial rotation to effect operation of said element to unlock said member for movement relative to the casing, and upon bodily movement to move said member.

4. A brake valve device for a fluid pressure brake system, comprising a casing, a valve operating stem, a member movable relative to said casing for operating said stem, interlocking means for preventing movement of said member relative to the casing, and an axially rotatable handle for said member adapted upon axial rotation to operate said means to permit movement of the member relative to the casing by bodily movement of said handle.

5. A brake valve device for a fluid pressure brake system, comprising a casing, a valve operating stem, a member movable relative to said casing for operating said stem, a removable handle carried by said member, and means for locking said handle to prevent removal from said member and operable by said handle in one position of said member to permit removal of said handle.

6. A brake valve device for a fluid pressure brake system, comprising a casing, a valve operating stem, a member movable relative to said casing for operating said stem, a removable handle carried by said member, and an element for locking said handle to prevent removal from said member and movable by said handle in one position of said member to permit removal of said handle and to lock said member against movement relative to said casing.

7. A control device comprising a casing, control means, a member movable relative to the casing for operating said control means, a removable handle carried by said member for moving the member, and an element, carried on and movable relative to said member, adapted in one position to prevent removal of the handle from said member and permit movement of the member relative to the casing, and in a second position to prevent movement of said member relative to the casing and permit removal of the handle from said member.

8. A control device comprising a casing, control means, a member movable relative to the casing for operating said control means, a removable handle carried by said member for moving the member, an element, carried on and movable relative to said member, adapted in one position to prevent removal of the handle from said member and permit movement of the member relative to the casing, and in a second position to prevent movement of said member relative to the casing and permit removal of the handle from said member, and means for preventing movement of said element into said second position except in a certain position of said member.

9. A control device comprising a casing, control means, a member movable relative to the casing for operating said control means, a removable handle carried by said member for moving said member, an element carried on and movable relative to the said member by said handle, said element being adapted in one position thereof to prevent removal of the handle from said member and in a second position thereof to permit removal of the handle from said member, and means cooperating with said element to prevent movement of said element out of the said one position except in a certain position of the said member and functioning cooperatively with said element in the second position thereof to prevent movement of said member relative to the casing.

10. A control device comprising a casing, control means, a member movable relative to the casing for operating said control means, a handle carried by said member for moving the member, an element carried on said member and movable relative thereto, by rotary movement of said handle on its own axis, out of one position, in which it prevents movement of the said member relative to the casing, to a second position, in which it permits movement of the said member relative to the casing, resilient means yieldingly opposing movement of said element into said second position, said handle being adapted to maintain said element in said second position in opposition to said resilient means upon a predetermined rotary movement of said handle on its own axis.

11. A control device comprising a casing, control means, a member movable relative to the casing for operating said control means, a handle carried by said member for moving the member, an element carried on said member adapted to be cooperatively engaged by said handle and moved thereby, upon a predetermined degree of rotary movement of the handle on its own axis, out of one position, in which it prevents movement of said member relative to the casing, to a second position, in which it permits movement of said member relative to the casing, resilient means yieldingly opposing movement of said element into said second position, said handle and said element cooperating in the second position of said element to maintain the element in the second position thereof in opposition to said resilient means.

12. A control device comprising a casing, control means, a member movable relative to the casing for operating said control means, a handle carried on said member for moving the member, an element carried on said member and movable relative thereto into one position in which it prevents movement of the said member relative to the casing and into a second position in which it permits movement of the said member relative to the casing, said handle being rotatable on its own axis to move the said element from the one to the other of said one and said second positions thereof, and means for yieldingly holding said handle against rotary movement on its own axis out of a position to which the handle is rotated in moving the said element into the said second position.

13. A control device comprising a casing, control means, a member movable relative to the casing for operating said control means, a handle carried on said member for moving the member, an element carried on said member and movable relative thereto into one position in which it prevents movement of the said member relative to the casing and into a second position in which it permits movement of the said member relative to the casing, said handle being rotatable on its own axis to move the said element from the one to the other of said one and said second positions thereof, and means for releasably locking said handle against rotary movement on its own axis out of a position to which the handle is rotated in moving the said element into the said second position.

14. A control device comprising a casing, control means, a member movable relative to the casing for operating said control means, a handle carried on said member for moving the member, an element carried on said member and movable relative thereto into one position in which it prevents movement of the said member relative to the casing and into a second position in which it permits movement of the said member relative to the casing, said handle being rotatable on its own axis to move the said element from the one to the other of said one and said second positions thereof, means for yieldingly holding said handle against rotary movement on its own axis out of a position to which the handle is rotated in moving the said element into the said second position, and means for rendering said last means ineffective.

15. A control device comprising a casing, control means, a member movable relative to the casing for operating said control means, a handle carried on said member for moving the member, an element carried on said member and movable relative thereto into one position in which it prevents movement of the said member relative to the casing and into a second position in which it permits movement of the said member relative to the casing, said handle being rotatable on its own axis to move the said element from the one to the other of said one and said second positions thereof, and means for releasably locking said handle against rotary movement on its own axis out of a position to which the handle is rotated in moving the said element into the said second position, and means for operating said last means to release said handle for rotation on its own axis.

16. A control device comprising a casing, control means, a member movable relative to the casing for operating said control means, an element carried on and movable relative to said member into one position in which it prevents movement of said member relative to the casing and into a second position in which it permits movement of said member relative to said casing, a handle carried by said member and having a cam thereon adapted to cooperatively engage and move said element upon rotary movement of said handle on its own axis, and means releasably engaging the cam on said handle for locking said handle in a position in which said element is in the second position thereof.

17. A brake valve device for a fluid pressure brake system, comprising a casing, a rotary valve operable in the casing, an operating stem by means of which said valve is operated, a socket member fixedly secured to the said stem, a removable operating handle received in the socket member, a sector plate mounted on said casing and partially covering said socket member, and means on said socket member cooperating with the outer periphery of said sector plate for yieldingly holding the socket member against operative movement and for indicating the exact position of the socket member relative to the sector plate.

18. A brake valve device for a fluid pressure brake system, comprising a casing, a rotary valve operative in the casing, an operating stem for said valve, a socket member secured to the said stem, an operating handle removably received in the socket member, a sector plate mounted on said casing adjacent said socket member for indicating the operative position of the said valve, and a movable element carried on said socket member functioning cooperatively with the sector plate at one time to lock the socket member and valve against operative movement and also at another time to prevent removal of said handle from the socket member.

19. A brake valve device for a fluid pressure brake system, comprising a casing, a rotary valve operative in the casing, an operating stem for said valve, a socket member secured to said stem, a valve operating handle removably received in said socket member, a plate mounted on the casing for indicating the operative position of said valve, and movable means carried on said socket member and cooperating with said indicating plate in one operative position of the socket member and valve to lock the said socket member and valve against operative movement while permitting removal of said handle from the socket member, and cooperating with said indicating plate in other positions of the socket member and valve to prevent removal of the handle from said socket member while permitting operative movement of the socket member and valve by the handle.

20. A brake valve device for a fluid pressure brake system, comprising a casing, a rotary valve operative in the casing, a stem for said valve, a socket member secured to said stem, a handle removably received by said socket member for manually effecting rotary operative movement of said valve through said socket member and stem, a movable element carried on the socket member functioning in one position thereof to lock said socket member and accordingly said valve against operative movement while permitting removal of said handle from the socket member, and functioning in a different position thereof to prevent removal of said handle from the socket member while permitting operative movement of the socket member and valve, and a position indicator member mounted on the casing adjacent the socket member, said indicator member being effective to prevent movement of the movable element out of the said different position thereof and into said one position thereof except when the socket member and valve are in a predetermined operative position, said indicator member cooperating with the said movable element when the movable element is in its said one position to lock the socket member and valve against operative movement.

CARLTON D. STEWART.